United States Patent

Yoshida et al.

[11] Patent Number: 5,571,585
[45] Date of Patent: Nov. 5, 1996

[54] RESIN-COATED PIPE

[75] Inventors: Jiichirou Yoshida, Ichihara; Syoich Nezu, Chiba; Junichi Ono, Okazaki, all of Japan

[73] Assignee: Sumitomo Chemical Company Limited, Osaka, Japan

[21] Appl. No.: 364,499

[22] Filed: Dec. 27, 1994

[30] Foreign Application Priority Data

Dec. 27, 1993 [JP] Japan .................................. 5-331575

[51] Int. Cl.$^6$ ...................................................... B32B 15/08
[52] U.S. Cl. ........................ 428/36.91; 138/140; 138/143; 138/145
[58] Field of Search ......................... 428/36.91; 138/143, 138/140, 145

[56] References Cited

U.S. PATENT DOCUMENTS

| | | | |
|---|---|---|---|
| 3,967,020 | 6/1976 | Uemura et al. | 428/36 |
| 4,071,048 | 1/1978 | Watase | 138/145 |

FOREIGN PATENT DOCUMENTS

| | | |
|---|---|---|
| 52-95759 | 8/1977 | Japan . |
| 61-255952 | 11/1986 | Japan . |
| 66653 | 1/1994 | Japan . |
| WO9003850 | 4/1980 | WIPO . |
| WO9012657 | 11/1990 | WIPO . |

*Primary Examiner*—Charles Nold
*Attorney, Agent, or Firm*—Sughrue, Mion, Zinn, Macpeak & Seas

[57] ABSTRACT

Disclosed is a resin-coated pipe, which is obtainable by extrusion coating a tubular base with a resin composition comprising 5 to 30% by weight of a component A and 95 to 70 by weight of a component B. Component A: an ethylene-α-olefin copolymer resin in which the melt flow rate at a temperature of 190° C. and under a load of 2.16 kg is 0.01 to 50 g per 10 min., the density is 0.910 g/cm$^3$ or below, and the maximum fusion peak temperature as measured by a differential scanning calorimeter is 60° C. or above. Component B: crystalline polypropylene, in which the melt flow rate at a temperature of 190° C. and under a load of 2.16 kg is 0.1 to 10 g per 10 min. The resin-coated pipe, using the above resin composition which is excellent in processibility, is excellent in the mechanical strength, normal and low temperature impact resistance, heat resistance, chipping resistance and coating surface appearance.

6 Claims, No Drawings

RESIN-COATED PIPE

BACKGROUND OF THE INVENTION

This invention relates to a resin-coated pipe and, more particularly, to a resin-coated pipe, which has a resin composition excellent in the processibility and is excellent in the mechanical strength, impact resistance at normal and low temperatures, heat resistance, chipping resistance and coating surface appearance.

Resin layers for resin-coated pipes are generally required to be excellent in the mechanical strength, impact resistance at normal and low temperatures, heat resistance, chipping resistance and coating surface appearance and also excellent in the processibility.

Heretofore, polyethylene obtained by high pressure process and ethylene-vinyl acetate copolymer have been used as a resin layer for resin-coated pipes. These materials, however, are inferior in the chipping resistance. The chipping resistance is a very important property in view of the protection of pipes, particularly steel pipes, used in outdoor places exposed to small stones or the like flying thereto. Coating resins which are obtainable by cross-linking high pressure process polyethylene or ethylene-vinyl acetate copolymer with peroxides or through electron beam irradiation are comparatively satisfactory in the chipping resistance. These resins, however, require a separate step of thermal shrinking at the time of coating the steel pipe. The coating process is therefore time-consuming, and thus the mass productivity is inferior.

SUMMARY OF THE INVENTION

In view of the above situation, it is an object of the invention to provide a resin-coated pipe, which has a resin composition excellent in the processibility and is excellent in the mechanical strength, impact resistance at normal and low temperatures, heat resistance, chipping resistance, and coating surface appearance.

According to the invention, there is provided a resin-coated pipe obtainable by extrusion coating a tubular base with a resin composition comprising 5 to 30% by weight of a component A as shown below and 95 to 70% by weight of a component B as shown below:

Component A: an ethylene-α-olefin copolymer resin, in which the melt flow rate at a temperature of 190° C. and under a load of 2.16 kg is 0.01 to 50 g per 10 min., the density is 0.910 g/cm$^3$ or below, and the maximum fusion peak temperature as measured by a differential scanning calorimeter is 60° C. or above.

Component B: crystalline polypropylene, in which the melt flow rate at a temperature of 190° C. and under a load of 2.16 kg is 0.1 to 10 g per 10 min.

DETAILED DESCRIPTION OF THE INVENTION

With the component A according to the invention, the melt flow rate at a temperature of 190° C. and under a load of 2.16 kg is 0.01 to 50 g per 10 min. If this melt flow rate is insufficient, it results in inferior processibility. If the rate is excessive, it results in inferior mechanical strength.

With the component A according to the invention, the density is 0.910 g/cm$^3$ or below. If the density is excessive, it results in inferior impact resistance at low temperatures.

With the component A according to the invention, the maximum fusion peak temperature as measured by a differential scanning calorimeter is 60° C. or above. If this temperature is insufficient, it results in inferior heat resistance.

In the component A according to the invention, α-olefin preferably has a carbon number of 3 to 12, more preferably a carbon number of 3 to 10. Examples of α-olefin are propylene, butene-1, 4-methylpentene-1, hexene-1, octene-1, decene-1, etc. These α-olefins may be used alone or in combinations. The α-olefin content in the component A is usually 1 to 30% by weight.

While the component A according to the invention is as shown above, more preferred embodiments of carrying out the invention may be given depending on the use of the resin-coated pipe as the object of the invention.

In one such preferred embodiment, the component A, which has the above requirements, is such that the melt flow rate at a temperature of 190° C. and under a load of 2.16 kg is 0.2 to 50 g per 10 min. and that its maximum fusion peak temperature as measured by a differential scanning calorimeter is 100° C. or above.

If the melt flow rate at a temperature of 190° C. and under a load of 2.16 kg is less than 0.2, the processibility may be insufficient.

If the maximum fusion peak temperature as measured by a differential scanning calorimeter is less than 100° C., the heat resistance is insufficient.

As a method of obtaining the above preferred component A, mention may be made of a method, in which ethylene and α-olefin are polymerized in the presence of a Ziegler type catalyst.

The polymerization is carried out at a normal polymerization temperature of 30° to 300° C., under a normal pressure to 3,000 kg/cm$^2$, in the presence or absence of catalyst and in a gas-solid, liquid-solid or homogeneous liquid phase. Further, the polymerization is preferably carried out in a high pressure bulk process at a polymerization temperature of 130° to 300° C. and under a polymerization pressure of 300 to 3,000 kg/cm$^2$.

The Ziegler type catalyst is preferably composed of a compound of a transition metal element in Group IVb and/or Vb of the periodic table of elements and a compound of a metal element in Group IIb and/or IIIa of the periodic table. Examples of the transition metal element compound are halides, alkoxides and the like with of titanium, zirconium, hafnium, vanadium, etc. Further, it is possible to suitably use a composite compound composed of such transition metal element compound and a halide of a typical metal in Group IIa and/or IIIa of the periodic table, such as magnesium chloride, aluminum chloride, etc. As the compound of a metal element in Group IIb and/or IIIa of the periodic table may suitably be used hydrides and/or organic metal compounds of zinc and/or aluminum.

Examples of the Ziegler type catalyst are those disclosed in Japanese Patent Laid-open Publication No. Sho 49-97088, Japanese Patent Laid-open Publication No. Sho 49-97089, Japanese Patent Laid-open Publication No. Sho 50-50487, Japanese Patent Laid-open Publication No. Sho 52-103485, Japanese Patent Laid-open Publication No. Sho 54-26889, Japanese Patent Laid-open Publication No. Sho 54-146285, Japanese Patent Laid-open Publication No. Sho 56-99209, Japanese Patent Laid-open Publication No. Sho 57-131208, Japanese Patent Laid-open Publication No. Sho 57-145106, Japanese Patent Laid-open Publication No. Sho 58-27706, Japanese Patent Laid-open Publication No. Sho 58-65708, Japanese Patent Laid-open Publication No. Sho 59-133210, etc.

In another more preferred embodiment, the component A, which has the above requirements, is such that the density is 0.860 to 0.910 g/cm$^3$, that the maximum fusion Peak temperature as measured by a differential scanning calorimeter is 60° to 120° C., preferably 65° to 115° C., and that the ratio of the weight-average molecular weight to the number-average molecular weight as measured by the GPC process is 1.5 to 3.0, preferably 1.8 to 2.8.

If the density is less than 0.860 g/cm$^3$, the mechanical strength may be insufficient.

If the maximum fusion peak temperature as measured by a differential scanning calorimeter exceeds 120° C., the crystalline component is in excess so that the impact resistance at low temperature may be insufficient.

If the ratio of the weight-average molecular weight to the number-average molecular weight as measured by the GPC process is less than 1.5, the processibility may be insufficient. If the ratio exceeds 3.0, on the other hand, the mechanical strength may be insufficient.

The above preferred component A may be obtained by any process without any restriction, for instance a high temperature-high pressure process, a gas phase polymerization process, a slurry polymerization process, a solution polymerization process, etc. As a usual process, mention may be made of a process in which a metallocene type or Ziegler type catalyst at a temperature in a range of 30° to 300° C. under a pressure in a range of normal pressure to 3,000 kg/cm$^2$ in the presence or absence of solvent in a gas-solid, liquid-solid or homogeneous liquid phase.

The process of polymerization with the use of a metallocene type catalyst in the presence of a hydrocarbon solvent under a pressure in a range of 1 to 30 kg/cm$^2$, is suitable from the standpoint that an ethylene-α-olefin copolymer having a narrower molecular weight distribution and a narrow chemical composition distribution is obtainable so that it is possible to realize more excellent mechanical strength.

The metallocene type catalyst is represented by a general formula $R^1_k R^2_l R^3_m R^4_n M$, wherein M represents zirconium, titanium, hafnium or vanadium, $R^1$ represents a group having a cycloalkadienyl skeleton, $R^2$ to $R^4$ represents a group having a cycloalkadienyl skeleton, an alkyl group, a cycloalkyl group, an aryl group, an aralkyl group, an alkoxy group, an aryloxy group, a halogen atom or a hydrogen atom, k and l represents 1 or a greater integer, and k+l+m+n=4. Mention may be made of a catalyst composed of (i) a transition metal compound including a ligand having a cycloalkadienyl skeleton or (ii) a transition metal compound which includes at least two ligands each having a cycloalkadienyl skeleton, and in which at least two ligands having a cycloalkadienyl skeleton are each bonded via a lower alkylene group, and (iii) an organic aluminum oxide compound.

A vanadium compound as the Ziegler type catalyst is represented by a general formula $VO(OR^5)_p X_{3-p}$, wherein $R^5$ represents a hydrocarbon group, X represents a halogen atom, and p represents a number of 0 to 3. Its examples are $VOCl_3$, $VO(OCH_3)Cl_2$, $VO(OCH_3)_2Cl$, $VO(OCH_3)_3$, $VO(OC_2H_5)Cl_2$, $VO(OC_2H_5)_2Cl$, $VO(OC_2H_5)_3$, $VO(OC_3H_7)Cl_2$, $VO(OC_3H_7)_2Cl$, $VO(OC_3H_7)_3$, $VO(OisoC_3H_7)Cl_2$, $VO(OisoC_3H_7)_2Cl$, $VO(OisoC_3H_7)_3$ and mixtures of the these compounds. With p of 0 to 1, it is possible to obtain an ethylene-α-olefin copolymer which has a narrower molecular weight distribution and a uniform chemical composition distribution.

Further, an organic aluminum compound as the Ziegler type catalyst is represented by a general formula $R^6_q AlX_{3-q}$, wherein $R^6$ represents a hydrocarbon group, X represents a halogen atom, and q represents a number of 1 to 3. Its examples are $(C_2H_5)_2AlCl$, $(C_4H_9)_2AlCl$, $(C_6H_{13})_2AlCl$, $(C_2H_5)_{1.5}AlCl_{1.5}$, $(C_4H_9)_{1.5}AlCl_{1.5}$, $(C_6H_{13})_{1.5}AlCl_{1.5}$, $C_2H_5AlCl_2$, $C_4H_9AlCl_2$, $C_6H_{13}AlCl_2$, etc. Preferable compounds are those in which q is 1 to $(C_2H_5)_{1.5}AlCl_{1.5}$ is particularly preferable.

Further, combining halogenated ester with the vanadium compound/organic aluminum compound catalyst system permits obtaining an ethylene-α-olefin copolymer, which has a narrower molecular weight distribution and a narrower chemical composition distribution, and is thus suitable for obtaining the copolymer according to the invention.

The halogenated ester is represented by a general formula $R^7COOR^8$, wherein $R^7$ represents an organic group obtained by substituting halogen for some or all of the hydrogen atoms of a hydrocarbon group with a carbon number of 1 to 20, and $R^8$ represents a hydrocarbon group with a carbon number of 1 to 20, and it is preferably a compound obtained by substituting chlorine for all substituted groups in $R^8$, for example, perchlorocrotonate. Its examples are ethyldichloroacetate, methyltrichloroacetate, ethyltrichloroacetate, methyldichlorophenylacetate, ethyldichlorophenylacetate, methylperchlorocrotonate, ethylperchlorocrotonate, propylperchlorocrotonate, isopropylperchlorocrotonate, phenylperchlorocrotonate, etc.

The component B according to the invention is a crystalline polypropylene in which the melt flow rate at a temperature of 190° C. and under a load of 2.16 kg is 0.1 to 10 g per 10 min., preferably 0.2 to 8 g per 10 min. If the melt flow rate is insufficient, the processibility is deteriorated. If the rate is excessive, the impact resistance is deteriorated.

As the component B, mention may be made of homopolymers of propylene, random copolymers containing propylene and 10% by weight or below of α-olefin, which excludes propylene, such as α-olefin having a carbon number of 2 or 4 to 10, e.g., ethylene, butene-1, pentene-1, hexene-1, heptene-1, octene-1, nonene-1, decene-1, 4-methylpentene-1, 4-methylhexene-1, 4,4-dimethylpentene-1, etc., and block copolymers 15% by weight or below of the above α-olefin and the like. The comonomer which is copolymerized with propylene is usually ethylene, but random terpolymers of ethylene-butene-propylene and block copolymers of ethylenebutene copolymer with propylene may be preferable.

The component B may be obtained by any method without any restriction, and it is possible to adopt any well-known method.

The resin composition according to the invention is composed of 5 to 30% by weight, preferably 5 to 20% by weight, of the component A and 95 to 70% by weight, preferably 80 to 95% by weight, of the component B. If the component A is insufficient (i.e., if the component B is excessive), the impact resistance at low temperature is inferior. If the component A is excessive (i.e., if the component B is insufficient), on the other hand, the chipping resistance and the mechanical strength are inferior.

The resin composition with the components A and B mixed in the above ranges according to the invention is suitably such that the melt flow rate at 190° C. is 0.05 to 10 g per 10 min. If the melt flow rate is insufficient, the fluidity of the material at the time of forming "processing" may be inferior. If the rate is excessive, on the other hand, the processibility of coating a tubular base may be inferior.

The resin composition according to the invention may be obtained by such method as mixing the components A and B by the usual mixing operation, such as a Banbury mixer process, an extrusion granulating process, etc. In this case, in addition to the components A and B, such additives as a neutralizing agent, an antioxidant, a weather-ability improving agent, an antistatic agent, a pigment, etc. may be added thereto in a range free from impeding the effects of the invention.

The resin-coated pipe according to the invention is obtainable by extrusion coating a tubular base with the above resin composition.

The tubular base is not particularly limited, and it is possible to use various metal pipes such as steel pipes, copper pipes, aluminum pipes, etc. Among these pipes, steel pipes are preferred. The shape of the pipe is not particularly limited, and the invention is applicable to straight pipes, bent pipes, etc. Further, the sectional profile of the pipe may be circular, polygonal, etc. Further, the surface of the pipe may be treated with fluorine resin coating or the like. Furthermore, the diameter of the pipe is not particularly limited, that is, it is possible to use pipes of various sizes. For example, the invention is applicable to such thin pipes as 10 mm or below in diameter.

As a method of extrusion coating a straight tubular base with the resin composition, for instance, one using crosshead dies for extrusion coating is excellent in view of the mass production and is thus preferable. This method permits continuously coating the entire pipe length, thus revolutionally improving the productivity and attaining energy saving.

The thickness of the resin coating is not particularly limited, but it is usually about 0.3 to 2 mm.

The extruder may be those which are used for usual extrusion granulation. The extrusion capacity of the extruder may be considered in dependence on the diameter of the pipe to be coated and the aiming thickness of the coating. As for the extruding conditions, the temperature setting for the usual extrusion granulation is sufficient, and it is possible to obtain resin-coated pipes with various coating thickness by adjusting the amount of the extruded resin according to the diameter of the pipe to be coated, process line speed and aiming coating thickness. Further, the obtained resin-coated pipe may be subjected to, for instance, a bending process, as secondary process.

As described in the foregoing, according to the invention, by using a resin composition excellent in processibility it is possible to provide a resin-coated pipe which is excellent in the mechanical strength, normal and low temperature impact resistance, heat resistance, chipping resistance and coating surface appearance.

EXAMPLES

The following examples are given for the purpose of illustration of this invention and are not intended as limitations thereof.

The following measurement and evaluation methods were adopted.

(1) Melt flow rate (MFR)

The measurement was made at 190° C. and under a load of 2.16 kg in conformity to JIS K7210.

(2) Density

A test piece was prepared in conformity to JIS K6760 and conditioned at 23° C. for one day without annealing. Then, the measurement was made.

(3) Maximum fusion peak temperature as measured with a differential scanning calorimeter Using a "Parkinelmer 7" type DSC, the maximum fusion peak temperature was measured in conformity to JIS K7121. The test piece was conditioned in conformity to 3-(2) of JIS K7121.

(4) number-average molecular weight $M_n$ and weight-average molecular weight $M_w$ Using a GPC measuring instrument manufactured by WATERS Inc., the average molecular weights were obtained in terms of polystyrene values.

(5) Stiffness (mechanical strength)

A test piece was cut out of a pressed sheet 1 mm in thickness. Measurement was made in conformity to ASTM D747.

(6) Low temperature shock test (low temperature impact resistance)

Using a high rate impact tester manufactured by Reometrix Inc., a sheet-like test piece 1 mm in thickness conditioned at −30° C. for 3 hr. was tested to evaluate the break-down state.

(7) Flying stone test (chipping resistance)

Using a gravelometer manufactured by Suga Tester Co., Ltd., the measurement was made in conformity JASO M104.

(8) Coating surface appearance

After the extrusion coating, the surface was visually evaluated as follows.

⊙ . . . excellent, ○ . . . good, × . . . bad

EXAMPLES 1 TO 5 AND COMPARATIVE EXAMPLES 1 TO 4

Resin-coated steel pipes were obtained by extrusion coating a tubular base with the compositions shown in Tables 1 and 2 using a extruder 30 mm in diameter with crosshead dies (i.e., non-bent uniaxial horizontal extruder manufactured by Union Plastics Inc.) under the conditions of a die temperature of 260° C., a processing line speed of 4.0 m/min., a steel pipe outer diameter of 8.0 mm and a coating thickness of 0.5 mm. The conditions and evaluation results are shown in Tables 1 to 4.

It is known from the above results that the Examples which meet the conditions according to the invention show satisfactory results in all the evaluation items. On the other hand, in Comparative Example 1 not using the component A, the low temperature impact resistance, low temperature chipping resistance and coating surface appearance were all inferior. In Comparative Example 2 only using the component A having a too high density without using the Component B, the stiffness and normal and low temperature chipping resistance were inferior. In Comparative Example 3, in which the density of the component A was too high, the low temperature impact resistance and low temperature chipping resistance were inferior. In Comparative Example 4, in which the component A was excessive (i.e., the component B was insufficient), the normal and low temperature chipping resistance and coating surface appearance were inferior.

TABLE 1

| Examples | 1 | 2 | 3 | 4 | 5 |
| --- | --- | --- | --- | --- | --- |
| Component A | | | | | |
| Kind *1 | A1 | A1 | A2 | A2 | A3 |
| Properties | | | | | |
| MFR(g per 10 min.) | 0.90 | 0.90 | 0.60 | 0.60 | 2.0 |

TABLE 1-continued

| Examples | 1 | 2 | 3 | 4 | 5 |
|---|---|---|---|---|---|
| Density (g/cm³) | 0.908 | 0.908 | 0.885 | 0.885 | 0.905 |
| Max. fusion peak temp. (°C.) | 115 | 115 | 65 | 65 | 92 |
| Mn × 10,000 | 11 | 11 | 12 | 12 | 9.6 |
| $M_w/M_n$ | 4.0 | 4.0 | 2.0 | 2.0 | 2.0 |
| Amount (wt. %) | 20 | 10 | 10 | 20 | 10 |
| Component B | | | | | |
| Kind *2 | B1 | B1 | B1 | B1 | B1 |
| Properties | | | | | |
| MFR(g per 10 min.) | 0.40 | 0.40 | 0.40 | 0.40 | 0.40 |
| Amount (wt. %) | 80 | 90 | 90 | 80 | 90 |
| MFR of components A and B *3 (g per 10 min.) | 0.45 | 0.40 | 0.41 | 0.43 | 0.47 |

TABLE 2

| Comparative Examples | 1 | 2 | 3 | 4 |
|---|---|---|---|---|
| Component A | | | | |
| Kind *1 | — | A4 | A5 | A2 |
| Properties | | | | |
| MFR (g per 10 min.) | — | 0.80 | 0.80 | 0.60 |
| Density (g/cm³) | — | 0.921 | 0.919 | 0.885 |
| Max. fusion peak temp. (°C.) | — | 120 | 115 | 65 |
| Mn × 10,000 | — | 11 | 11 | 12 |
| $M_w/M_n$ | — | 11 | 4.0 | 2.0 |
| Amount (wt. %) | 0 | 100 | 10 | 40 |
| Component B | | | | |
| Kind *2 | B1 | — | B1 | B1 |
| Properties | | | | |
| MFR (g per 10 min.) | 0.40 | — | 0.40 | 0.40 |
| Amount (wt. %) | 100 | 0 | 90 | 60 |
| MFR of components A and B *3 (g per 10 min.) | 0.40 | 0.80 | 0.43 | 0.47 |

TABLE 3

| Examples | 1 | 2 | 3 | 4 | 5 |
|---|---|---|---|---|---|
| Evaluation | | | | | |
| Stiffness (kg/cm²) | 6,300 | 7,600 | 7,500 | 7,000 | 8,000 |
| Low temperature impact test (−30° C.) | ductile | ductile | ductile | ductile | ductile |
| Flying stone test | | | | | |
| +23° C. | ◯ | ◯ | ◉ | ◯ | ◉ |
| −30° C. | ◯ | ◯ | ◯ | ◉ | ◯ |
| Coating surface appearance | ◉ | ◯ | ◉ | ◉ | ◉ |

TABLE 4

| Comparative Examples | 1 | 2 | 3 | 4 |
|---|---|---|---|---|
| Evaluation | | | | |
| Stiffness (kg/cm²) | 9,300 | 2,300 | 9,000 | 4,500 |
| Low temperature impact test (−30° C.) | brittle | ductile | brittle | ductile |
| Flying stone test | | | | |
| +23° C. | ◯ | X | ◯ | X |
| −30° C. | X | X | X | X |
| Coating surface appearance | X | ◯ | ◯ | X |

*1 Kind of component A:

A1: Ethylene-butene-1 copolymer (butene-1 content: 11 wt. %, prepared by high pressure bulk process under a polymerization pressure of 1,000 kg/cm² and at a polymerization temperature of 200° C.)

A2: ethylene-butene-1 copolymer (butene-1 content: 18 wt. %)

A3: ethylene-butene-1 copolymer (butene-1 content: 10 wt. %)

A4: ethylene-butene-1 copolymer (butene-1 content: 7 wt. %, provided by Mitsubishi Yuka Co., Ltd., straight chain low density polyethylene "UE320" (a trade name))

A5: ethylene-butene-1 copolymer (butene-1 content: 7 wt. %)

*2 Kind of component B:

B1: crystalline ethylene-propylene block copolymer (ethylene content: 6 wt. %)

*3 MFR of components A and B

Melt flow rate of the mixture of the components A and B

What is claimed is:

1. A resin-coated pipe obtainable by extrusion coating a tubular base with a resin composition comprising 5 to 30% by weight of a component A as shown below and 95 to 70% by weight of a component B as shown below:

Component A: an ethylene-α-olefin copolymer resin in which the melt flow rate at a temperature of 190° C. and under a load of 2.16 kg is 0.01 to 50 g per 10 min., the density is 0.910 g/cm or below, and the maximum fusion peak temperature as measured by a differential scanning calorimeter is 60° C. or above;

Component B: a block copolymer containing propylene and up to 15% by weight α-olefin having a carbon number of 2 or of 4 to 10, in which the melt flow rate at a temperature of 190° C. and under a load of 2.16 kg is 0.1 to 10 g per 10 min.

2. The resin-coated pipe according to claim 1, wherein regarding to said component A, the melt flow rate at a temperature of 190° C. and under a load of 2.16 kg is 0.2 to 50 g per 10 min., and the maximum fusion peak temperature as measured by a differential scanning calorimeter is 100° C. or above.

3. The resin-coated pipe according to claim 1, wherein regarding to said component A, the density is 0.860 to 0.910 g/cm³, the maximum fusion peak temperature as measured by a differential scanning calorimeter is 60° to 120° C., and the ratio of the weight-average molecular weight to the number-average molecular weight as measured by GPC method is 1.5 to 3.0.

4. The resin-coated pipe according to claim 1, wherein α-olefin in said component A is α-olefin having a carbon number of 3 to 12.

5. The resin-coated pipe according to claim 1, wherein the resin coating has a thickness of 0.3 to 2 mm.

6. The resin coated pipe according to claim 1, wherein the tubular base is a steel pipe.

* * * * *